Dec. 19, 1967 — T. CHARLTON — 3,359,476
MULTI-SPEED SINGLE-PHASE MOTOR
Filed April 16, 1965 — 2 Sheets-Sheet 1
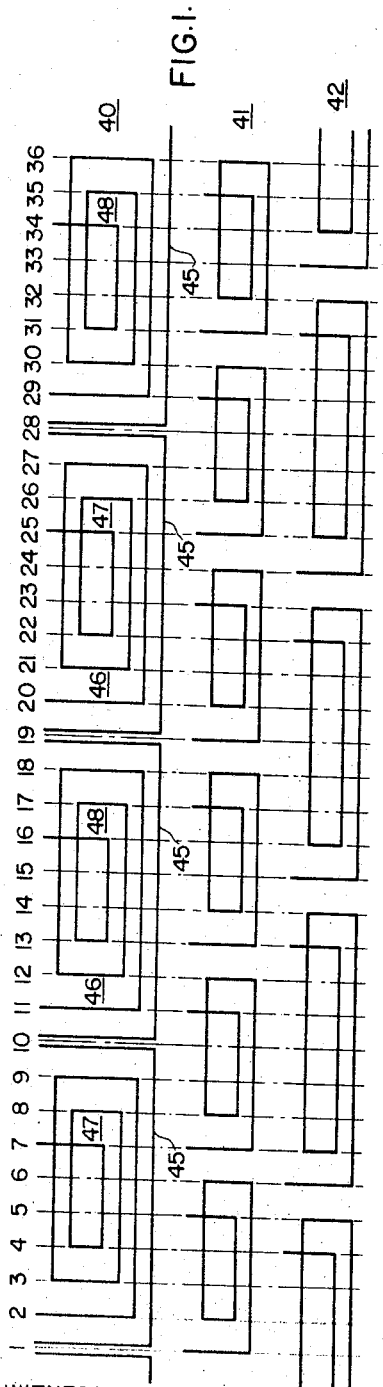
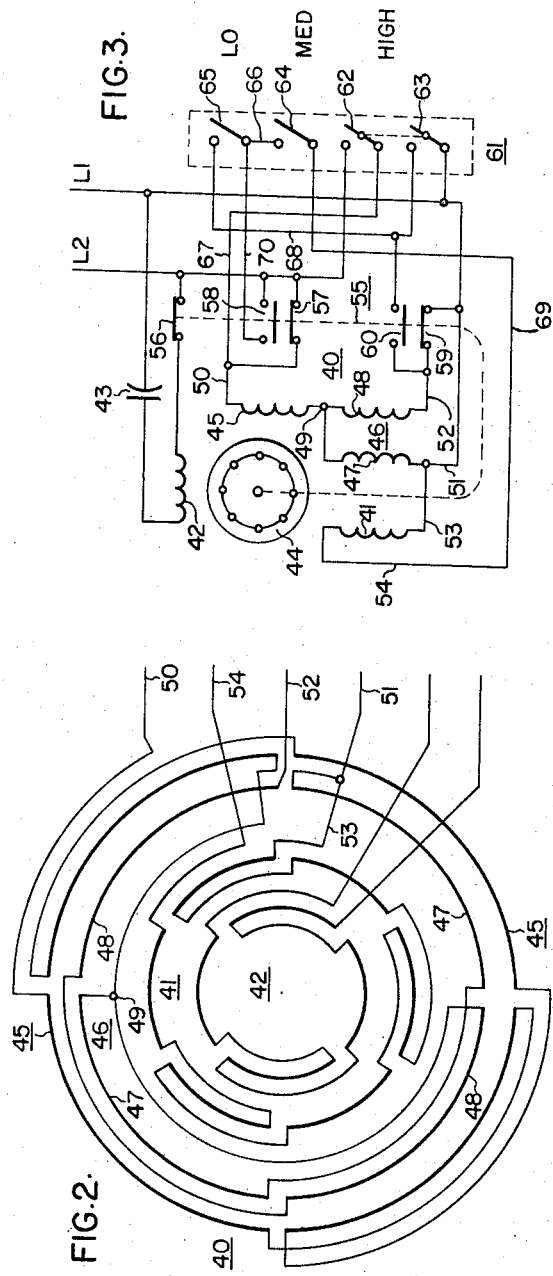
WITNESSES
Theodore F. Wrobel
James F. Young
INVENTOR
Thomas Charlton
BY
ATTORNEY Dec. 19, 1967  T. CHARLTON  3,359,476
MULTI-SPEED SINGLE-PHASE MOTOR
Filed April 16, 1965  2 Sheets-Sheet 2

United States Patent Office 3,359,476
Patented Dec. 19, 1967

3,359,476
MULTI-SPEED SINGLE-PHASE MOTOR
Thomas Charlton, Lima, Ohio, assignor to Westinghouse Electric Corporation, Pittsburgh, Pa., a corporation of Pennsylvania
Filed Apr. 16, 1965, Ser. No. 448,776
14 Claims. (Cl. 318—224)

ABSTRACT OF THE DISCLOSURE

A multi-speed single-phase motor having a two-speed winding and connected in sections and arranged to use both sections for high speed operation and one section only in a consequent pole arrangement for low speed operation. A third speed is obtainable by using another winding. Switching means are provided for always starting in the high speed connection and running at the speed selected by a selector switch.

---

The present invention relates to multi-speed single-phase electric motors, and more particularly to an improved winding arrangement for obtaining two speeds from a single motor winding.

The invention is particularly intended for single-phase motors of the capacitor start or split phase types which have a main primary winding and an auxiliary or starting primary winding displaced from each other on the stator of the motor and carrying currents displaced in phase to develop a starting torque, the auxiliary winding being disconnected from the line when the motor has come up to speed.

It is often necessary to design motors of these types for operation at two or more different speeds. This can be done by providing two or more separate main windings having different numbers of poles. This is not an entirely satisfactory solution of the problem of obtaining multi-speed operation, however, since only one winding is energized at a time and the material in the unused winding or windings is idle. Thus, the winding material in the motor is not used efficiently and the material and labor content of such motors increases considerably as the number of speeds is increased. It is also difficult to obtain the desired starting and running performance at all speeds without unduly increasing the size of the motor.

For these reasons, it is highly desirable to minimize the amount of winding material required by obtaining two speeds from a single main winding. This has been done heretofore by the use of a consequent pole winding connection for the lower speed. That is, the poles of the winding alternate in polarity in the normal manner for high speed operation, while for low speed operation the connections are changed so that all poles of the winding have the same polarity and consequent poles are formed between them, so that in effect the winding has twice as many poles as in the high speed connection and the motor runs at a corresponding low speed. Two-speed windings of this type are well known but they have a serious disadvantage since the number of active conductors in the winding is fixed and their relation cannot be changed for the two different speeds. Thus, if the winding is designed to obtain a desired torque and input on one speed, the performance on the other speed is fixed and cannot be changed independently. For this reason, it is usually necessary to compromise in the design of such a winding to obtain acceptable performance at both speeds even though the performance obtained may not be optimum and may not be what is desired for both speeds. This has been a serious problem in the design of conventional two-speed windings and has frequently made it necessary to use separate windings to obtain the desired torques and inputs on both speeds where a satisfactory compromise in a single winding could not be found.

The principal object of the present invention is to provide a multi-speed single-phase motor in which two speeds are obtained from a single winding, and in which the relation of active conductors for the two different speeds can be varied as desired in the design of the winding, so that great freedom in design is obtained and the winding can readily be designed for desired or optimum performance at both speeds.

Another object of the invention is to provide a multi-speed single-phase motor in which two speeds are obtained from a single winding which consists of two sections arranged so that both sections are used for high speed operation of the motor and one section only is connected as a consequent pole winding for low speed operation, thus permitting great freedom in design and obtaining the advantages of a single two-speed winding without the disadvantages of the conventional two-speed winding.

A further object of the invention is to provide a multi-speed single-phase motor which has a single main winding for obtaining two different speeds, and preferably an additional main winding for a third speed, and which has a single and improved switching means for always starting the motor in its high speed connection and for thereafter effecting operation of the motor at any one of the three speeds as determined by a speed selector switch.

More specifically, a single-phase motor is provided which has a main primary winding consisting of two sections which are disposed in the slots of the stator so that their poles coincide in position. One of these sections is divided into two subsections each consisting of alternate poles. For high speed operation, the first and second sections of the winding are both connected in the circuit with the subsections of the second section in parallel with each other. Corresponding poles of both sections are of the same polarity and the poles alternate in polarity around the stator in the usual manner. For low speed operation, only the second section of the winding is used and one of the subsections is reversed with respect to the other, so that all poles are of the same polarity and a consequent pole winding is formed. A second main winding may also be provided having a different number of poles to obtain a third speed. A starting switch is used which in its starting position connects the windings directly to the line in the high speed connection, so that the motor always starts on its high speed. After the starting switch operates, it connects the winding to the line through a speed selector switch so that the motor runs at any one of the three speeds as determined by the position of the selector switch. Thus a motor is provided having a two-speed winding in which the relative numbers of active conductors in the two connections can be independently adjusted in the design of the motor to obtain the desired performance on both speeds. The advantages of a single winding for two speeds are thus obtained but with the freedom in design which has previously been obtainable only by using two separate windings.

The invention will be more fully understood from the following detailed description, taken in connection with the accompanying drawing, in which:

FIGURE 1 is a diagrammatic developed view of the motor windings in a typical embodiment of the invention;

FIG. 2 is a connection diagram of the windings;

FIG. 3 is a schematic diagram showing the motor and switching circuits;

Figure 5:
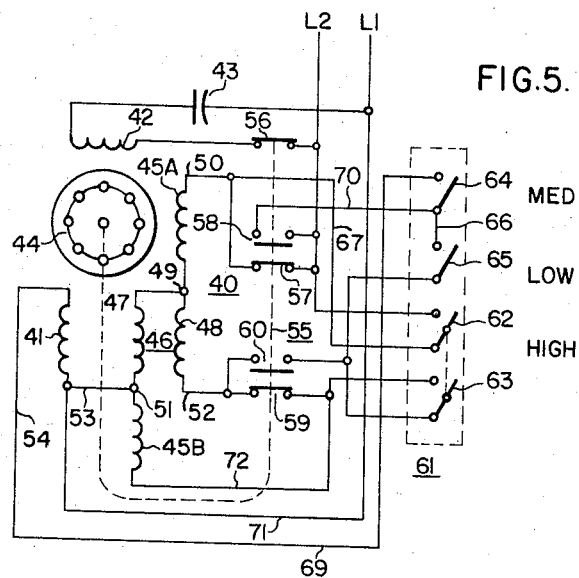
FIG. 5 is a schematic diagram showing the motor and switching circuits for the embodiment of FIG. 4.

The invention is shown in the drawing for the purpose of illustration embodied in a three-speed motor. The motor has a first main primary winding 40 which is connectable to obtain two different speeds, as more fully described hereinafter, and has a second main winding 41 with a different number of poles to provide a third speed. An auxiliary or starting winding 42 is provided and is shown as being connected in series with a capacitor 43 to obtain the necessary phase displacement of the current. It will be understood, however, that the invention could also be applied to a motor of the split phase type in which case the capacitor 43 would be omitted. The motor is shown diagrammatically as having a rotor 44 which carries a secondary winding of any suitable type shown as a squirrel cage winding.

The arrangement of the windings on the stator of the motor in a typical embodiment is shown in FIGURE 1 which is a diagrammatic developed view of a stator core having thirty-six slots indicated by vertical lines numbered 1 to 36 inclusive. The windings are shown as comprising a plurality of concentric coils disposed in pole groups, each coil having any suitable number of turns. It will be understood that the windings are wound successively in the same slots although they have been shown separated for clarity of illustration. The connections between the pole groups of each winding are shown in FIG. 2 but have been omitted in FIG. 1 to avoid undue complication of the drawing.

The first main winding 40 is shown as a four pole winding consisting of four pole groups each made up of a plurality of concentric coils which may be wound in the slots in the usual manner. The winding 40, however, is divided into two sections 45 and 46. The first section 45 of the winding 40 is shown as consisting of the outside coil of each coil group, that is, the coils in slots 1 and 10, slots 10 and 19, slots 19 and 28, and slots 28 and 1. These coils are connected together, as shown in FIG. 2 so that the poles alternate in polarity in the usual manner. The second section 46 of the first main winding 40 consists of the remaining coils of each coil group and is divided into two subsections 47 and 48. The coils of alternate pole groups are connected together as shown in FIG. 2 with the same polarity to form one subsection 47 and the coils of the remaining poles are connected together, also with the same polarity, to form the other subsection 48. One end of the first section 45 and one end of each of the subsections 47 and 48 are connected together at a common junction 49. A terminal lead 50 is brought out from the other end of the first section 45 and terminal leads 51 and 52 are brought out from the other ends of the subsections 47 and 48, respectively.

The main winding 40 is connectable, as explained hereinafter, to provide for operation as either a four pole or an eight pole winding. A third speed is provided by the second main winding 41 which is shown as a six pole winding to provide an intermediate speed. The winding 41 is shown as a conventional six pole winding consisting of six pole groups of concentric coils disposed in the slots of the stator as shown in FIG. 1 and connected together with alternating polarity as shown in FIG. 2. A terminal lead 53 is brought out from one end of the winding 41 and a terminal lead 54 is brought out from the other end.

The auxiliary winding 42 is intended to cooperate with the main winding 40 to always start the motor in the high speed connection. The auxiliary winding 42 therefore is shown as a conventional four pole winding consisting of four pole groups of concentric coils connected together with alternating polarity as shown in FIG. 2, and displaced from the main winding 40 by ninety electrical degrees as shown in FIG. 1.

To obtain high speed operation of the motor, the terminal lead 50 of the first section 45 of the main winding 40 is connected to one side of a single-phase line. The terminal leads 51 and 52 of the two subsections of the second section 46 are connected together and to the other side of the line. Referring to FIG. 3, it will be seen that this puts the two sections 45 and 46 of the winding 40 in series with each other across the line, with the two subsections of the second section 46 in parallel. Since the poles of the second section coincide in position with the poles of the first section, as seen in FIG. 1, and in this connection the polarities of corresponding poles of the two sections are the same, a four pole winding is formed with the poles alternating in polarity around the stator. The motor thus will start and run at its high speed as a four pole motor.

For low speed operation, the terminal 51 of the subsection 47 of the section 46 is connected to one side of the line while the terminal 52 of the other subsection 48 is connected to the other side of the line. In this connection, therefore, the first section 45 of the winding 40 is not used, and the second section 46 only is connected across the line but with the subsection 48 reversed with respect to the subsection 47. The four poles of the winding section 46, therefore, are all of the same polarity in this connection and consequent poles will form between them, so that an eight pole consequent pole winding is provided and the motor runs at its low speed of approximately half the high speed.

For the third speed, the main winding 40 is not used and the second main winding 41 is connected along across the line as a normal six pole winding so that the motor operates at an intermediate speed. It will be understood, of course, that the invention is not limited to any particular number of poles, and that the third speed could either be intermediate the speeds obtained from the winding 40 or could be a still higher or lower speed, if desired, since the number of poles of the winding 41 has no necessary relation to the number of poles of the winding 40. Any desired combination of speeds can thus be obtained.

As previously stated, it is desired for the motor to always start on the high speed connection and to run thereafter on any one of the three available speeds. This result may be obtained by any suitable switching means but a preferred switching circuit is shown in FIG. 3. The motor is provided with a starting switch 55 which may be any suitable type of starting switch having a starting position and a running position. The switch 55 may for example be a centrifugally actuated switch, as indicated by the dotted connection to the rotor 44, or it might be a current or voltage operated relay which operates to change from one position to the other when the motor reaches a predetermined speed. The switch 55 is shown in the drawing in its starting position and has three sets of contacts. The first contact 56 is closed in the starting position and is connected in series with the auxiliary winding 42 as shown. The second set of contacts has a front contact 57 which is closed in the starting position and a back contact 58 which closes in the running position. The third set of contacts has a front contact 59 which is closed in the starting position and a back contact 60 which closes in the running position of the switch.

A speed selector switch 61 is also provided to select the speed at which the motor is to operate. The selector switch 61 may be any suitable type of switching device and may be actuated manually or automatically in any desired manner. As shown for the purpose of illustration, the switch 61 has two high speed switch contacts 62 and 63 which are operated together as indicated by the dotted connection. The switch 61 also has a medium speed switch contact 64 and a low speed switch contact 65; the contacts 64 and 65 being connected by a conductor 66.

The motor windings are connected to the starting switch 55 and to the selector switch 61 as shown in FIG. 3. The terminal lead 50 of the section 45 of the main winding 40 is connected to the contact 57 of the starting switch and through a conductor 67 to the high speed selector switch contact 62. One side L2 of a single-phase supply line is connected to the starting switch contacts 57 and 58 and to the other side of the high speed switch contact 62. The terminal lead 51 of the subsection 47 and the terminal lead 53 of the second main winding 41 are connected together and directly to the other side L1 of the line. The terminal lead 52 of the other subsection 48 is connected to the starting switch contacts 59 and 60. The contact 59 is connected to the line L1, and the contact 60 is connected to the high speed switch contact 63 and through a conductor 68 to the low speed contact 65. The other terminal lead 54 of the second main winding 41 is connected through a conductor 69 to the medium speed switch contact 64.

In starting the motor, the starting switch 55 is in the position shown in FIG. 3. The auxiliary winding 42 is connected directly across the line through the closed starting switch contact 56. The terminal lead 50 of the first section 45 of main winding 40 is connected through starting switch contact 57 to the line L2. The terminal lead 51 of subsection 47 of the second section of the winding 40 is connected to the line L1 and the terminal lead 52 of the subsection 48 is also connected to line L1 through the starting switch contact 59. Thus the two sections of the main winding 40 are connected to the line through the starting switch for operation at high speed as described above. It will be noted that in the starting position of the switch 55, the motor windings are connected to the line by the starting switch independently of the selector switch 61 so that the motor is always in the high speed connection when the switch 55 is in its starting position. Since the four pole auxiliary winding 42 is also connected to the line, the motor will start if the line L1, L2 is energized, as by an external line switch (not shown), and the motor will start as a four pole motor and accelerate to the switch operating speed. When the switch 55 operates and changes from its starting to its running position, the contact 56 opens to disconnect the auxiliary winding and the contacts 58 and 60 close to connect the main windings to the line through the selector switch 61. The motor will then run at any one of its three speeds as determined by the position of the selector switch.

For high speed operation the selector switch contacts 62 and 63 are closed. In this position the terminal lead 50 is connected through conductor 67 and switch contact 62 to line L2. The terminal lead 51 of subsection 47 remains connected directly to line L1. Terminal lead 52 of subsection 48 is connected to line L1 through starting switch contact 60 and selector switch contact 63. Thus, the windings remain in the high speed connection and the motor continues to operate at its high speed.

For medium speed operation, the selector switch contact 64 is closed, the other selector switch contacts being open. The terminal lead 53 of the second main winding 41 is connected directly to the line L1, and the other terminal lead 54 of the winding 41 is connected through conductor 69, selector switch contact 64, conductor 66, a conductor 70, and starting switch contact 58 to line L2. Thus the main winding 41 is connected alone across the line and the motor will operate at the intermediate speed.

For low speed operation, the selector switch contact 65 is closed. The terminal lead 51 of subsection 47 remains connected to the line L1. The terminal lead 52 of subsection 48 is connected through starting switch contact 60, conductor 68, selector switch contact 65, conductor 70, and starting switch contact 58 to the line L2. Thus the two subsections 47 and 48 of winding section 46 are connected in series across the line with the subsection 48 reversed in polarity with respect to the subsection 47, so that the motor operates at low speed as previously described.

A switching arrangement is thus provided which connects the motor windings to the line in the high speed connection for starting independently of the selector switch, so that the motor always starts on the high speed connection. A simple switching arrangement is provided to connect the motor to the line through the selector switch when the starting switch has operated to its running position, and the switching arrangement provides for series or parallel connection of the winding section 46 of the main winding 40 in a relatively simple way to provide for operation of the motor at the desired speed after the starting switch has operated. It will be understood that the selector switch might be of any suitable type having switch contacts arranged and connected as described to complete the circuit connections for the different speeds.

The switching arrangement just described provides a relatively simple and effective means for selecting the desired speed of operation of the motor while always starting on the high speed connection. Under some circumstances, however, an undesirable effect may occur. It will be noted from FIG. 3 that the starting switch contact 59 is connected directly to one side of the line and, when the selector switch contact 65 is closed for low speed operation, the corresponding back contact 60 is connected to the other side of the line through the selector switch contact and starting switch contact 58. If the starting switch operates when the current is at or near its peak value, it is possible for an arc to occur between the contacts 59 and 60 directly across the line with no substantial impedance to limit the current. This high-current arc will persist until the next current zero and, while this is essentially a transient phenomenon and does not affect the performance of the motor, it is undesirable as it may cause erosion or sticking of the starting switch contacts. This undesirable arcing can readily be prevented by inserting sufficient impedance between the line and the starting switch contact 59 to limit the current and suppress any arcing that may tend to occur.

Figure 4:
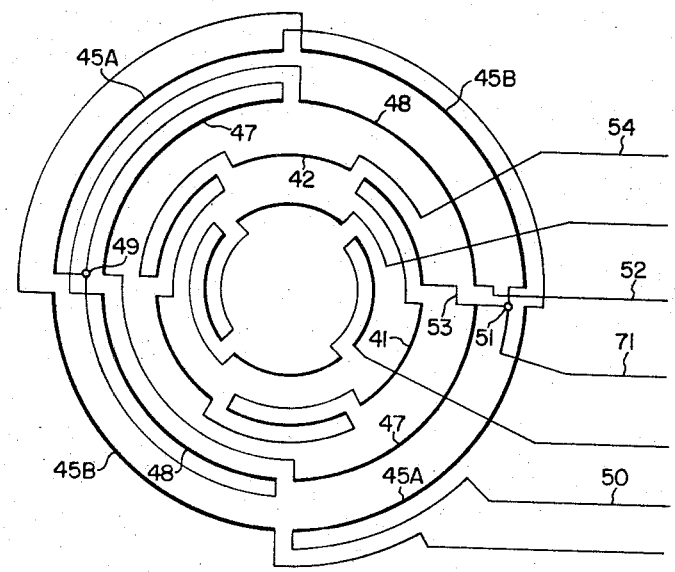
FIG. 4 is a connection diagram of another embodiment of the invention.

FIGS. 4 and 5 show a modified embodiment of the invention in which a portion of the main winding 40 is used to provide the desired impedance in series with the starting switch contacts in a simple manner which does not substantially affect the performance of the motor.

The motor and switching circuits shown in FIGS. 4 and 5 are essentially the same as those shown in FIGS. 2 and 3 and previously described, and the same reference numerals have been used. In the embodiment of FIGS. 4 and 5, however, the first section 45 of the main winding 40 is connected in two subsections 45A and 45B, each consisting of pole groups of like polarity with the pole groups of the two subsections alternating. Thus, the subsection 45A may consist of the coils lying in slots 1 and 10 and slots 19 and 28 of FIG. 1, and the subsection 45B may consist of the coils lying in slots 10 and 19 and slots 28 and 1, with the coils of each subsection connected together to form poles of the same polarity and with the poles of the two subsections of opposite polarity and corresponding in polarity to the poles of the second section 46 of the winding as previously described.

The subsection 45A of the winding 40 is connected to the terminal lead 50 and to the junction 49 between the two subsections 47 and 48 of the second section 46 of the winding 40. The subsection 45B is connected to the terminal lead 51 of the subsection 47 which is connected directly to line L1 by a lead 71. The other end of the subsection 45B is connected by a conductor 72 to the starting switch contact 59 and to the high speed selector switch contact 63. The other connections of the motor windings and switch contacts are identical to those previously described.

In the starting position of the switch 55, as shown in FIG. 5, the terminal lead 50 of the subsection 45A is connected to the line L2 by the starting switch contact 57. The subsection 47 is connected to the line L1 by conductor 71. Subsection 48 is connected by terminal lead 52, switch contact 59 and conductor 72 to subsection 45B, and the other end of subsection 45B is connected by terminal lead 51 and conductor 71 to line L1. It will be seen that subsection 45A is connected in series with section 46 of the winding 40 with the subsections 47 and 48 in parallel, as before, but with the subsection 45B in series with subsection 48. Since the polarities of the poles of the subsections 45A and 45B correspond to those of the subsections 47 and 48, as described above, a four pole winding is formed and the motor starts in its high speed connection as previously described with starting performance substantially the same as in the embodiment of FIG. 3. It will be noted, however that the subsection 45B is connected between the switch contact 59 and line L1 so that even if the low speed selector switch contact 65 is closed to connect switch contact 60 to line L2 upon operation of the starting switch, the impedance of subsection 45B is in series with the starting switch contacts across the line so that any tendency to arcing between contacts 59 and 60 is suppressed.

The operation of the circuit of FIG. 5 to select the desired speed after the starting switch 55 moves to its running position is similar to the previously described. Thus, if the selector switch contacts 62 and 63 are closed for high speed operation, terminal lead 50 is connected to line L2 by conductor 67 and switch contact 62. Subsection 47 is connected to line L1 by conductor 71 and subsection 48 is connected to line L1 through switch contact 60, selector switch contact 63, conductor 72, winding subsection 45B, and conductor 71. Thus the windings are connected as described above for starting and the motor continues to run at its high speed. For low speed and medium speed operation, the connections are exactly the same as described above in connection with FIG. 3.

Thus, in the embodiment of FIGS. 4 and 5, the motor winding connections are essentially similar to those of FIGS. 2 and 3, and the performance is substantially the same, but a portion of the main winding 40 is connected to provide an impedance between the starting switch contact 59 and the line to suppress any tendency to arcing between the contacts 59 and 60.

It will be seen that in either embodiment a two-speed main winding arrangement has been provided which eliminates the problems encountered with conventional two-speed windings. Since the two sections of the winding are both used for one speed and the second section only for the other speed, it is readily possible in the design of the winding to adjust the relations of active conductors in the two winding sections to obtain any desired torque and input on both speeds. The limitations on design encountered in conventional two-speed windings are thus eliminated and it is possible to use a single two-speed winding in cases where two separate windings would have been necessary heretofore. This of course results in a more efficient use of the winding material and a smaller and more efficient motor. The desired torques and inputs and other performance characteristics on both high and low speed can be obtained substantially independently of each other with a single two-speed winding. It is also to be noted that the winding requires no special or unusual arrangement and can readily be wound on a standard winding machine so that the cost is kept low.

A particular embodiment of the invention has been shown and described for the purpose of illustration, but it will be apparent that various modifications are possible. Thus if it is desired to make the motor reversible, the auxiliary winding 42 can be connected to the line through a reversing switch of any desired type to reverse the auxiliary winding with respect to the main windings. If only two speeds are necessary, the second main winding 41 and switch contact 64 could be omitted, resulting in a two-speed motor. It is frequently desirable to provide for energization of some auxiliary device or equipment associated with the motor which is to be energized only when the motor is in operation. It will be noted that the starting switch contact 58 can be used for this purpose since it is energized from the line L2 whenever the motor is running, and a terminal connected to the switch contact 58 may be provided for this purpose if desired.

It will be apparent therefore that although a particular embodiment of the invention has been shown and described, numerous modifications and other embodiments of the invention are possible, and it is to be understood that all such modifications and embodiments are within the scope of the invention.

I claim:

1. A multi-speed single-phase motor having a main primary winding and an auxiliary primary winding displaced from each other and adapted to be connected to a single-phase line, said main primary winding comprising first and second sections having the same number of poles with the poles coinciding in position, and means for connecting said first and second sections of the main winding to the line with the poles alternating in polarity for operation at one speed and for connecitng the second section only of the main winding to the line with all poles of the same polarity for operation at another speed.

2. A multi-speed single-phase motor having a main primary winding and an auxiliary primary winding displaced from each other and adapted to be connected to a single-phase line, said main primary winding comprising first and second sections having the same number of poles with the poles coinciding in position, means for connecting said first and second sections of the main winding to the line with the poles of both sections alternating in polarity for operation at one speed, and means for connecting the second section only of the main winding to the line with alternate poles reversed so that all poles have the same polarity for operation at another speed.

3. A multi-speed single-phase motor having a main primary winding and an auxiliary primary winding displaced from each other and adapted to be connected to a single-phase line, said main primary winding comprising first and second sections having the same number of poles with the poles coinciding in position, the first section being connected with its poles alternating in polarity, the second section having alternate poles connected together in one subsection and the remaining poles connected together in another subsection, means for connecting said first and second sections of the main winding to the line with said subsections connected so that their poles are of opposite polarity and correspond to the poles of the first section, and means for connecting the second section only of the main winding to the line with said subsections connected so that their poles are of the same polarity.

4. A multi-speed single-phase motor having a main primary winding and an auxiliary primary winding displaced from each other and adapted to be connected to a single-phase line, said main primary winding comprising first and second sections having the same number of poles with the poles coinciding in position, the first section being connected with its poles alternating in polarity, the second section having alternate poles connected together in one subsection and the remaining poles connected together in another subsection, means for connecting said first and second sections of the main winding to the line with said subsections connected so that their poles are of opposite polarity and correspond to the poles of the first section, and means for connecting the second section only of the main winding to the line with one of said subsections reversed with respect to the other so that all poles of the second section are of the same polarity.

5. A multi-speed single-phase motor having a main primary winding and an auxiliary primary winding displaced from each other and adapted to be connected to a single-phase line, said main primary winding comprising first and second sections having the same number of poles with the poles coinciding in position, the first, section being connected with its poles alternating in polarity, the second section having alternate poles connected together in one subsection and the remaining poles connected together in another subsection, means for connecting said first and second sections of the main winding to the line with said subsections connected in parallel with each other so that their poles are of opposite polarity and correspond to the poles of the first section, and means for connecting said second section only of the main winding to the line with said subsections in series so that one subsection is reversed with respect to the other and all poles are of the same polarity.

6. A multi-speed single-phase motor having a main primary winding and an auxiliary primary winding displaced from each other and adapted to be connected to a single-phase line, said primary winding comprising a plurality of pole groups each consisting of a plurality of coils, certain of the coils of each pole group being connected together in a first section of the winding with the pole groups alternating in polarity, the remaining coils of each pole group forming a second section of the winding, the coils of alternate pole groups of the second section being connected together in one subsection and the coils of the remaining pole groups of the second section being connected together in another subsection, means for connecting said first and second sections of the main winding in series to the line with said subsections connected so that their poles are of opposite polarity and correspond to the poles of the first section, and means for connecting the second section only of the main winding to the line with said subsections connected so that their poles are of the same polarity.

7. A mutli-speed single-phase motor having a main primary winding and an auxiliary primary winding displaced from each other and adapted to be connected to a single-phase line, said primary winding comprising a plurality of pole groups each consisting of a plurality of coils, certain of the coils of each pole group being connected together in a first section of the winding with the pole groups alternating in polarity, the remaining coils of each pole group forming a second section of the winding, the coils of alternate pole groups of the second section being connected together in one subsection, and the coils of the remaining pole groups of the second section being connected together in another subsection, means for connecting said first and second sections of the main winding in series to the line with said subsections connected in parallel with each other so that their poles are of opposite polarity and correspond to the poles of the first section, and means for connecting said second section only of the main winding to the line with said subsections in series so that one subsection is reversed with respect to the other and all poles are of the same polarity.

8. A multi-speed single-phase motor having a main primary winding and an auxiliary primary winding displaced from each other and adapted to be connected to a single-phase line, said main primary winding comprising first and second sections having the same number of poles with the poles coinciding in position, the first section being connected with its poles alternating in polarity, the second section having alternate poles connected together in one subsection and the remaining poles connected together in another subsection, selector switch means for connecting said first and second sections of the main winding to the line with the poles of the second section corresponding in polarity to those of the first section for operation at a first speed and for connecting the second section only of the main winding to the line with one of said subsections reversed with respect to the other subsection so that all poles are of the same polarity for operation at a second speed, and starting switch means having a starting position and a running position, said starting switch means in its starting position connecting the first and second sections of the main winding to the line independently of the selector switch for operation at said first speed, the starting switch in its running position connecting the sections of the main winding to the selector switch for operation at either of said speeds as determined by the selector switch.

9. A multi-speed single-phase motor having first and second main primary windings having different numbers of poles, an auxiliary primary winding having the same number of poles as the first main winding and being displaced therefrom, said first main winding comprising first and second sections disposed with their poles coinciding in position, the first section being connected with its poles alternating in polarity and the second section having alternate poles connected together in one subsection and the remaining poles connected together in another subsection, selector switch means having a plurality of positions for connecting both sections of the first main winding to a single-phase line with the poles of the second section having the same polarity as the poles of the first section for operation at a first speed, for connecting the second section only of the first main winding to the line with all poles of the same polarity for operation at a second speed, and for connecting the second main winding to the line for operation at a third speed, and starting switch means having a starting position and a running position, said starting switch means in its starting position connecting both sections of the first main winding to the line independently of the selector switch for operation at said first speed, and the starting switch means in its running position connecting said main windings to the line through the selector switch for operation at any of said speeds as determined by the position of the selector switch.

10. A multi-speed single-phase motor having first and second main primary windings having different numbers of poles, an auxiliary primary winding having the same number of poles as the first main winding and being displaced therefrom, said first main winding comprising first and second sections disposed with their poles coinciding in position, the first section being connected with its poles alternating in polarity and the second section having alternate poles connected together in one subsection and the remaining poles connected together in another subsection, selector switch means having a first position for connecting the two sections of the first main winding in series to a single-phase line with the subsections of the second section in parallel with their poles having the same polarity as the poles of the first section for operation at a first speed, the selector switch means having a second position for connecting the second section only of the first main winding to the line with its subsections in series and all poles of the same polarity for operation at a second speed, the selector switch means having a third position for connecting the second main winding to the line for operation at a third speed, and starting switch means having a starting position and a running position, said starting switch means in its starting position connecting both sections of the first main winding to the line independently of the selector switch for operation at said first speed, the starting switch means in its running position connecting said main windings to the line through the selector switch for operation at any of said speeds as determined by the position of the selector switch.

11. A multi-speed single-phase motor having first and second main primary windings having different numbers of poles, an auxiliary primary winding having the same number of poles as the first main winding and being displaced therefrom, said first main winding comprising first and second sections disposed with their poles coinciding in position, the first section being connected with its poles alternating in polarity and the second section having alternate poles connected together in one subsection and the remaining poles connected together in another subsection, one end of said first section of the first main winding and one end of both subsections of the second section of the first main winding being connected together, the other end of a first one of said subsections and one end of the second main winding being connected together and to one side of a single-phase line, selector switch means having a first position for connecting the other end of the first section of the first main winding to the other side of the line and for connecting the other ends of both subsections of the second section together for operation at a first speed, the selector switch means having a second position for connecting the other end of the second one of said subsections to said other side of the line for operation at a second speed, the selector switch means having a third position for connecting the other end of the second main winding to the other side of the line for operation at a third speed, and starting switch means having a starting position and a running position, said starting switch means in its starting position connecting both sections of the first main winding to the line independently of the selector switch for operation at said first speed, the starting switch means in its running position connecting said main windings to the line through the selector switch for operation at any of said speeds as determined by the position of the selector switch.

12. A multi-speed single-phase motor having a main primary winding and an auxiliary primary winding displaced from each other and adapted to be connected to a single-phase line, said main primary winding comprising first and second sections having the same number of poles with the poles coinciding in position, the second section having alternate poles connected together in one subsection and the remaining poles connected together in another subsection, means for connecting said first and second sections of the main winding to the line with said subsections of the second section in parallel and with a portion of the first section in series with the second section and another portion of the first section in series with one of the subsections, the poles of both sections corresponding in polarity and being of alternating polarity, for operation at one speed, and means for connecting said second section only of the main winding to the line with one subsection reversed with respect to the other, for operation at another speed.

13. A multi-speed single-phase motor having a main primary winding and an auxiliary primary winding displaced from each other and adapted to be connected to a single-phase line, said main primary winding comprising first and second sections having the same number of poles with the poles coinciding in position, the second section having alternate poles connected together in one subsection and the remaining poles connected together in another subsection, means for connecting said first and second sections of the main winding to the line with a portion of the first section connected to one side of the line and in series with the second section, the two subsections of the second section being connected in parallel to the other side of the line and another portion of the first section being connected in series with one of said subsections, the poles of both sections corresponding in polarity and being of alternating polarity, for operation at one speed, and means for connecting the second section only of the main winding to the line with the two subsections in series, for operation at another speed.

14. A multi-speed single-phase motor having a main primary winding and an auxiliary primary winding displaced from each other and adapted to be connected to a single-phase line, said main primary winding comprising first and second sections having the same number of poles with the poles coinciding in position, the second section having alternate poles connected together in one subsection and the remaining poles connected together in another subsection, selector switch means having a first position for connecting said first and second sections of the main winding to the line with a portion of the first section connected to one side of the line and in series with the second section, the two subsections of the second section being connected in parallel to the other side of the line and another portion of the first section being connected in series with one of said subsections, the poles of both sections corresponding in polarity and being of alternating polarity, for operation at one speed, the selector switch means having a second position for connecting the second section only of the main winding to the line with the two subsections in series, for operation at another speed, and a starting switch having a starting position and a running position, said starting switch in its starting position connecting both sections of the main winding to the line independently of the selector switch for operation at said first speed, the starting switch in its running position connecting both sections of the main winding to the selector switch for operation at either of said speeds as determined by the position of the selector switch.

References Cited

UNITED STATES PATENTS

| | | | |
|---|---|---|---|
| 2,033,525 | 3/1936 | Kennedy | 318—224 |
| 2,174,758 | 10/1939 | Rall | 318—224 |
| 2,310,874 | 2/1943 | Schiff | 318—220 |
| 2,728,038 | 12/1955 | Koch | 318—220 |
| 2,896,144 | 7/1959 | Mollenberg | 318—224 |
| 3,263,144 | 7/1966 | Neyhouse et al. | 318—224 |

ORIS L. RADER, *Primary Examiner.*

G. Z. RUBINSON, *Assistant Examiner.*